United States Patent
Iijima et al.

(10) Patent No.: US 7,892,509 B2
(45) Date of Patent: Feb. 22, 2011

(54) SYSTEM AND METHOD FOR RECOVERING $CO_2$

(75) Inventors: Masaki Iijima, Hiroshima (JP); Tomio Mimura, Hyogo (JP); Yasuyuki Yagi, Hyogo (JP)

(73) Assignee: Mitsubishi Heavy Industries, Ltd., Osaka (JP)

( * ) Notice: Subject to any disclaimer, the term of this patent is extended or adjusted under 35 U.S.C. 154(b) by 986 days.

(21) Appl. No.: 11/513,272

(22) Filed: Aug. 31, 2006

(65) Prior Publication Data

US 2007/0053817 A1   Mar. 8, 2007

(30) Foreign Application Priority Data

Sep. 1, 2005   (JP) .............................. 2005-254047

(51) Int. Cl.
  *B01D 53/01*   (2006.01)
  *B01D 53/05*   (2006.01)

(52) U.S. Cl. ....................... 423/220; 423/228

(58) Field of Classification Search ............ 423/220
   See application file for complete search history.

(56) References Cited

U.S. PATENT DOCUMENTS

| | | | |
|---|---|---|---|
| 3,563,696 A | 2/1971 | Benson | |
| 3,932,582 A | 1/1976 | Eickmeyer | |
| 4,853,012 A | 8/1989 | Batteux et al. | |
| 5,853,680 A * | 12/1998 | Iijima et al. | 423/220 |
| 6,579,508 B2 * | 6/2003 | Ishida | 423/220 |
| 2004/0035147 A1* | 2/2004 | Iijima et al. | 62/613 |
| 2004/0092774 A1* | 5/2004 | Mimura et al. | 564/497 |
| 2004/0221578 A1* | 11/2004 | Iijima et al. | 60/649 |
| 2004/0253159 A1* | 12/2004 | Hakka et al. | 423/228 |
| 2006/0204425 A1* | 9/2006 | Kamijo et al. | 423/437.1 |
| 2006/0248890 A1* | 11/2006 | Iijima et al. | 60/645 |

FOREIGN PATENT DOCUMENTS

| | | |
|---|---|---|
| EP | 1 688 173 A2 | 8/2006 |
| EP | 1 695 756 A1 | 8/2006 |
| JP | 7-51537 A | 2/1995 |
| JP | 08089756 A * | 4/1996 |
| SU | 982757 | 12/1982 |
| WO | WO-2004/005818 A2 | 1/2004 |
| WO | WO-2005/097299 A1 | 10/2005 |

* cited by examiner

*Primary Examiner*—Melvin C Mayes
*Assistant Examiner*—Kenneth Vaden
(74) *Attorney, Agent, or Firm*—Birch, Stewart, Kolasch & Birch, LLP (57) ABSTRACT

A $CO_2$ recovery system includes an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution. A heating member is provided in the regeneration tower. The heating member heats the rich solution in the regeneration tower with steam generated when regenerating the rich solution in the regeneration tower.

7 Claims, 6 Drawing Sheets

SYSTEM AND METHOD FOR RECOVERING $CO_2$

BACKGROUND OF THE INVENTION

1. Field of the Invention

The present invention relates to a $CO_2$ recovery system and method for achieving energy saving.

2. Description of the Related Art

In recent years the greenhouse effect produced by $CO_2$ has been pointed out as one of causes of the global warming, and a countermeasure against it is urgently required internationally to protect global environment. $CO_2$ is emitted during various human activities, including burning of fossil fuels, and there is an increasing demand to suppress the $CO_2$ emission. Consequently, people have been energetically studying means and methods for suppressing emission of $CO_2$ from power generation facilities such as power plants which use an enormous amount of fossil fuels. One of the methods includes bringing combustion exhaust gas of boilers into contact with an amine-based $CO_2$-absorbing solution. This method allows removal and recovery of $CO_2$ from the combustion exhaust gas. Another method includes storing recovered $CO_2$, i.e., not returning the recovered $CO_2$ to the atmosphere.

Various methods are known for removing and recovering $CO_2$ from combustion exhaust gas using the $CO_2$-absorbing solution. One of the methods includes contacting the combustion exhaust gas with the $CO_2$-absorbing solution in an absorption tower, heating an absorbing solution having absorbed $CO_2$ in a regeneration tower, and releasing $CO_2$, regenerating the absorbing solution, and circulating the absorbing solution recovered to the absorption tower again to be reused. A conventional technique has been disclosed in, for example, Japanese Patent Application Laid-Open No. H7-51537.

SUMMARY OF THE INVENTION

It is an object of the present invention to at least partially solve the problems in the conventional technology.

According to an aspect of the present invention, a $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution, includes a heating member that is provided in the regeneration tower and that heats the rich solution in the regeneration tower with steam generated when regenerating the rich solution in the regeneration tower.

According to another aspect of the present invention, a $CO_2$ recovery method including causing $CO_2$-containing gas to come in contact with $CO_2$-absorbing solution to produce $CO_2$ rich solution in an absorption tower, conveying the rich solution to a regeneration tower, and producing a lean solution from the rich solution by removing $CO_2$ from the rich solution in the regeneration tower, includes heating the rich solution in the regeneration tower with steam generated when regenerating the rich solution in the regeneration tower.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. The present invention is not to be limited by the following embodiments and examples.

Figure 1:
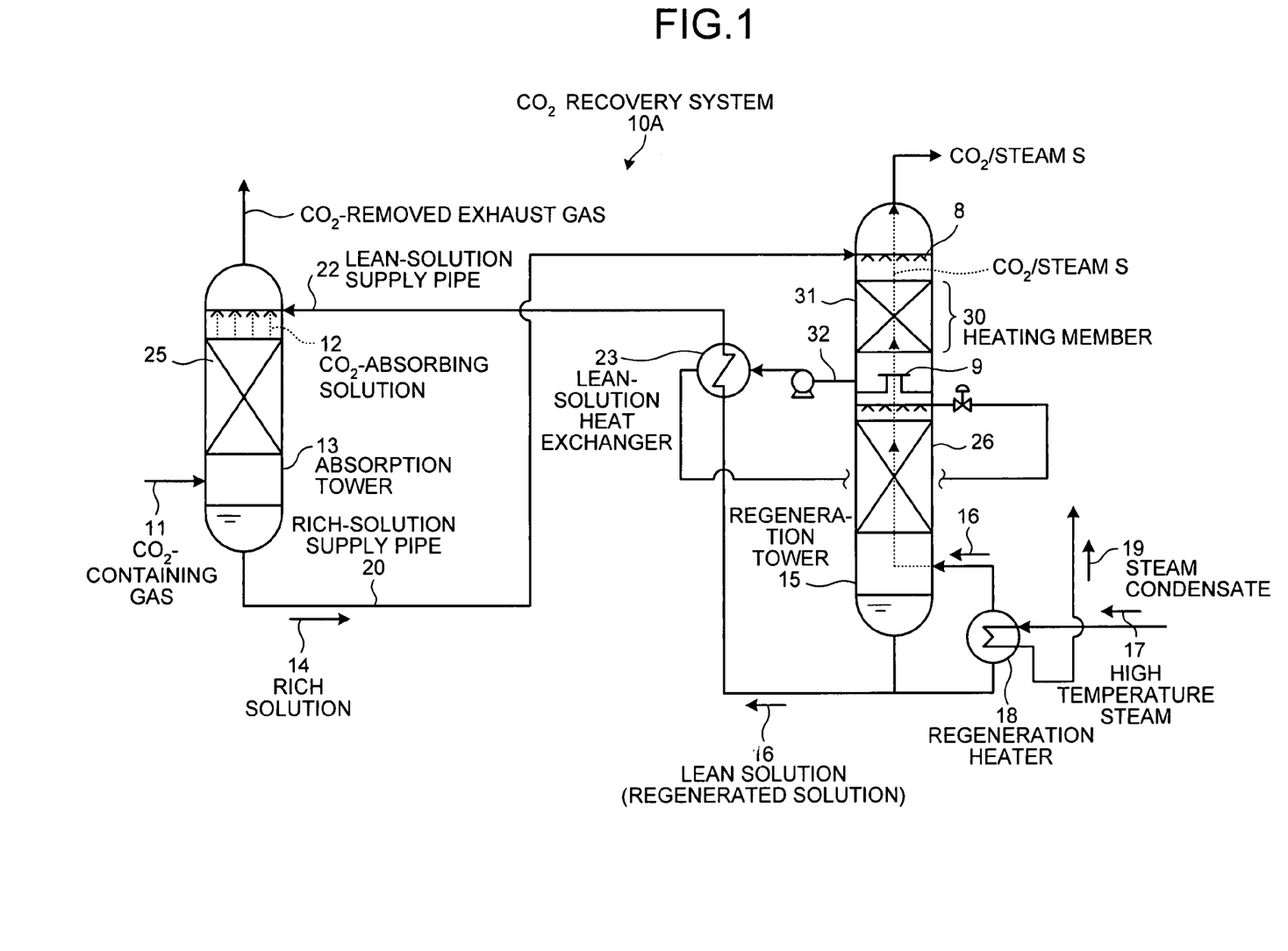
FIG. 1 is a schematic of a $CO_2$ recovery system according to a first embodiment of the present invention.

FIG. 1 is a schematic of a $CO_2$ recovery system 10A according to a first embodiment. The $CO_2$ recovery system 10A includes an absorption tower 13 that causes $CO_2$-containing gas 11 containing $CO_2$ to contact with a $CO_2$-absorbing solution 12 to produce a $CO_2$-rich solution 14; and a regeneration tower 15 that regenerates the rich solution 14 to produce a lean solution (regenerated solution) 16 by heating the rich solution 14 with steam S generated by heating the lean solution with high temperature steam 17 in a regeneration heater 18. The lean solution 16 is reused in the absorption tower 13. The rich solution 14 is introduced from a tower head via a nozzle 8 to the regeneration tower 15. The regeneration tower 15 includes a heating member 30, in which the rich solution 14 is heated with the steam S, which is generated by heating the lean solution 16 in the regeneration heater 18 or generated by a heat exchange in a lean-solution heat exchanger 23. According to the first embodiment, the heating member 30 includes a filling layer 31 to improve contact efficiency between the rich solution 14 and the steam S.

Conventionally, the steam S generated by heating the lean solution 16 has been exhausted with $CO_2$ to the outside after the steam S is used for producing the lean solution 16. However, according to the present invention, almost all heat of the steam S can be effectively used. Thus, heat energy of the steam S to be exhausted to the outside can be used by the introduced rich solution 14 in the regeneration tower 15. As a result, energy consumption in the regenerating system can be reduced.

According to the first embodiment, the lean-solution heat exchanger 23 is provided in a lean-solution supply pipe 22 that supplies the lean solution 16 from the regeneration tower 15 to the absorption tower 13. The lean-solution heat exchanger 23 further heats the rich solution 14, which is heated by the steam S and extracted via an extraction path 32, with residual heat of the lean solution 16. In this manner, the heat of the lean solution 16 is reused to heat the rich solution 14.

In FIG. 1, reference numeral 8 represents a nozzle, 9 represents a chimney tray, 25 represents a filling layer provided in the absorption tower 13, and 26 represents a filling layer provided in the regeneration tower 15. The heat exchanger can be any device that transfers heat of one material to another material. The heat exchanger can be the plate heat exchanger and the shell-and-tube heat exchanger that are known in the art. The $CO_2$-absorbing solution can be any medium that can absorb CO2. The $CO_2$-absorbing solution can be, for example, a hindered amine group having alkanolamine or alcoholic hydroxyl. Monoethanolamine, diethanolamine, triethanolamine, methyldiethanolamine, diisopropanolamine, diglycolamine, are the example of alkanolamine; however, it is preferable to use monoethanolamine (MEA). The hindered amine having alcoholic hydroxyl can be exemplified by 2-amino-2-methyl-1-propanol (AMP), 2-(ethylamino)-ethanol (EAE), and 2-(methylamino)-ethanol (MAE).

The $CO_2$-containing gas 11 is first cooled by a cooling device (not shown) to about 40° C. to 50° C. and then supplied to the $CO_2$ recovery device. On the other hand, the lean solution 16 is cooled to about 40° C. by another cooling device (not shown) and then supplied to the absorption tower 13.

The rich solution 14 output from the absorption tower 13 is maintained at about 50° C. due to heat reaction and supplied to the regeneration tower 15. The temperature of the rich solution 14 supplied to the regeneration tower 15 is raised by about 10° C. with the heat of the steam S.

Figure 2:
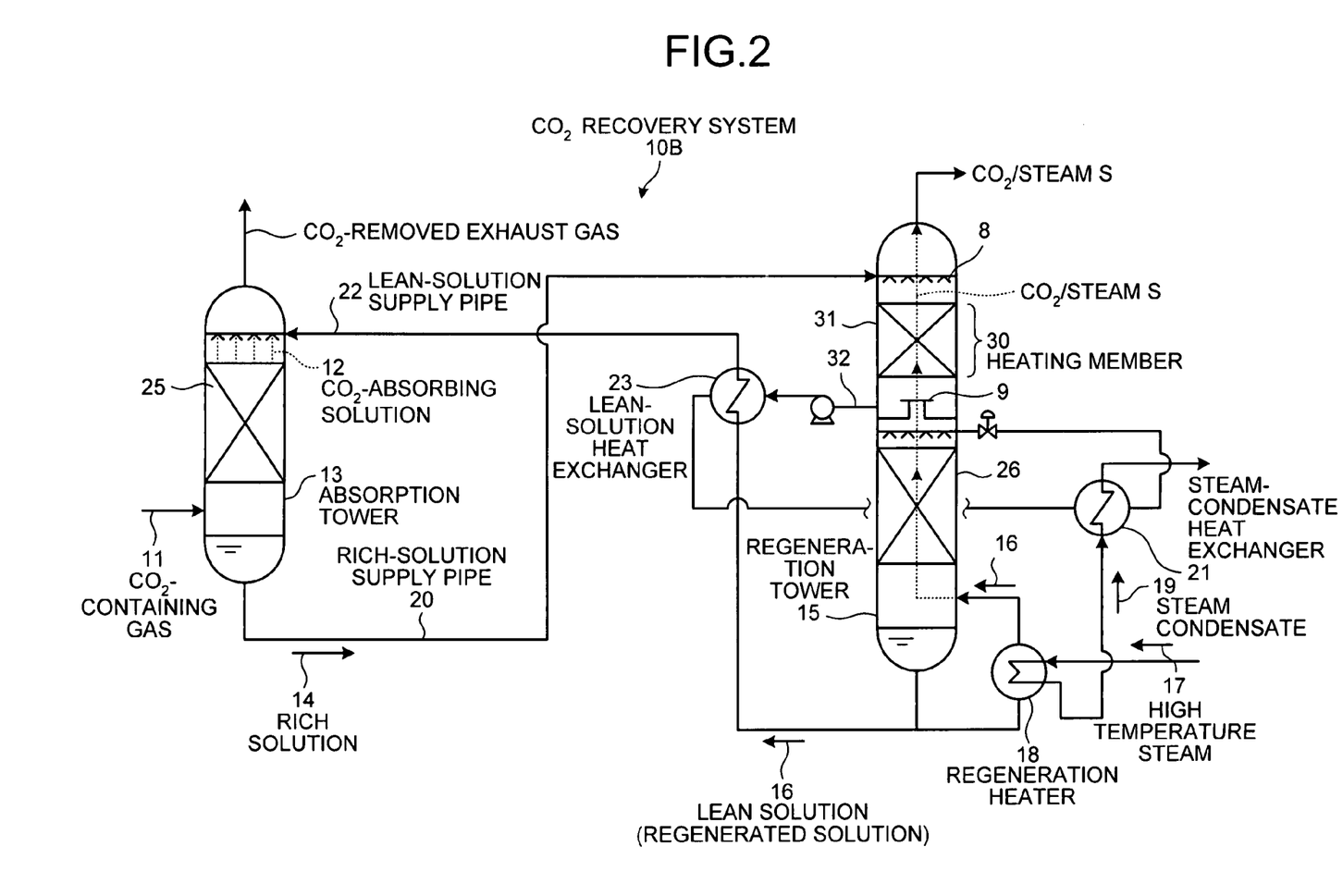
FIG. 2 is a schematic of a $CO_2$ recovery system according to a second embodiment of the present invention.

FIG. 2 is a schematic of a $CO_2$ recovery system 10B according to a second embodiment of the present invention. Components that are the same as those of the $CO_2$ recovery system 10A are assigned with the same reference numerals, and explanation thereof is omitted.

The $CO_2$ recovery system 10B includes, in addition to the configuration of the $CO_2$ recovery system 10A, a steam-condensate heat exchanger 21. The steam-condensate heat exchanger 21 further heats the rich solution 14, which has been heated in the lean-solution heat exchanger 23, with steam condensate 19 fed from the regeneration heater 18.

The steam-condensate heat exchanger 21 heats the rich solution 14 with the residual heat of the steam condensate 19 and introduces the heated rich solution 14 into the regeneration tower 15. Thus, because the residual heat of the steam condensate 19 having been once used in the regeneration heater 18 is reused, the energy consumption in the regenerating system can be further reduced compared with that of the first embodiment. If the lean-solution heat exchanger 23 is configured in a multistage, it is preferable to configure the corresponding steam-condensate heat exchanger 21 also in a multistage.

Figure 3:
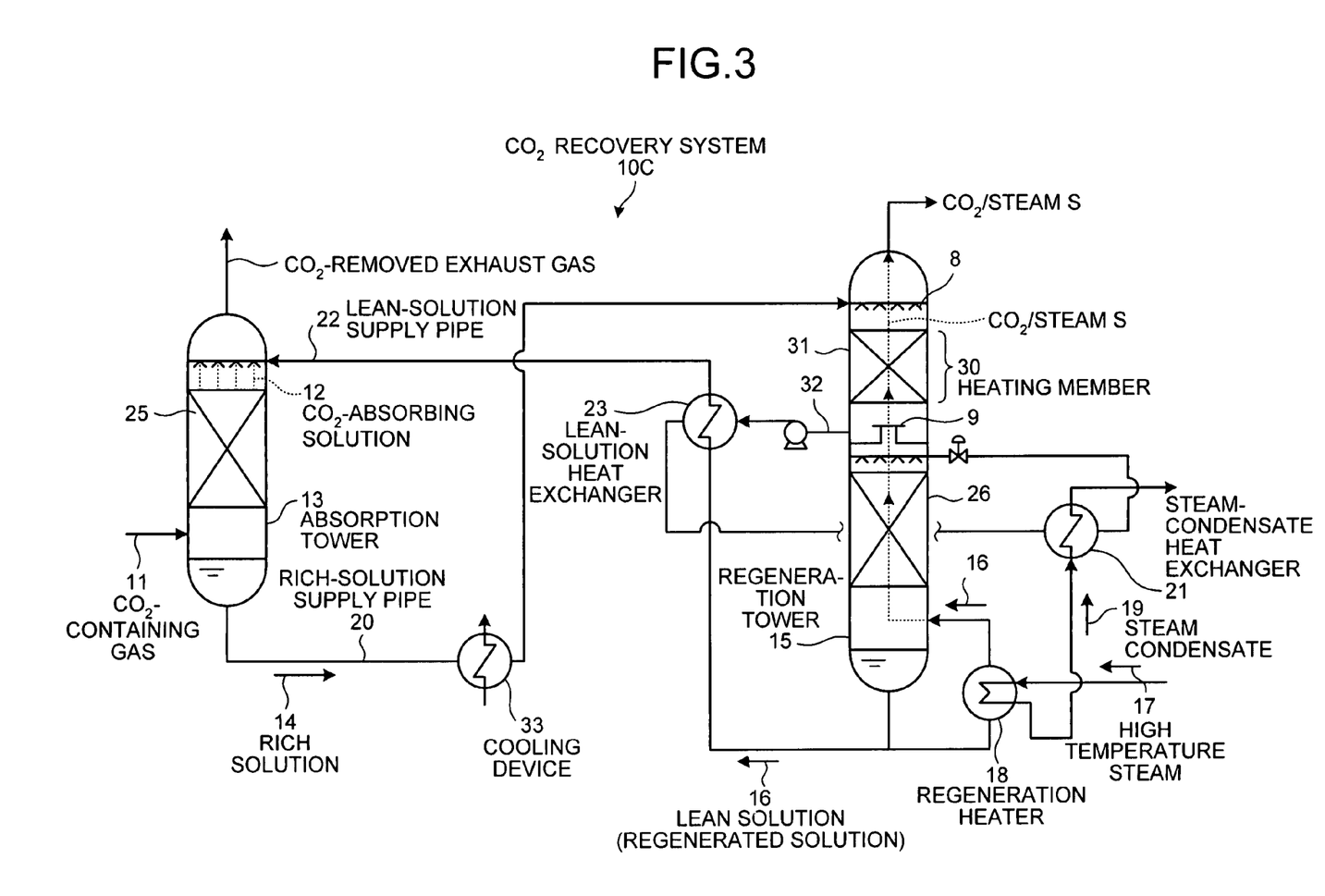
FIG. 3 is a schematic of a $CO_2$ recovery system according to a third embodiment of the present invention.

FIG. 3 is a schematic of a $CO_2$ recovery system 10C according to a third embodiment of the present invention. Components that are the same as those in each of the $CO_2$ recovery systems 10A and 10B are assigned with the same reference numerals, and explanation thereof is omitted.

The $CO_2$ recovery system 10C includes, in addition to the configuration of the $CO_2$ recovery system 10B, a cooling device 33 that cools the rich solution 14 in a rich-solution supply pipe 20. The rich-solution supply pipe 20 supplies the rich solution 14 from the absorption tower 13 to the regeneration tower 15. As a result of the cooling, the temperature of the rich solution 14 decreases thereby decreasing the heat exchange amount in the heating member 30 of the regeneration tower 15. As a result, reduction in the supply amount of steam used in the regeneration tower 15 can be achieved.

Figure 4:
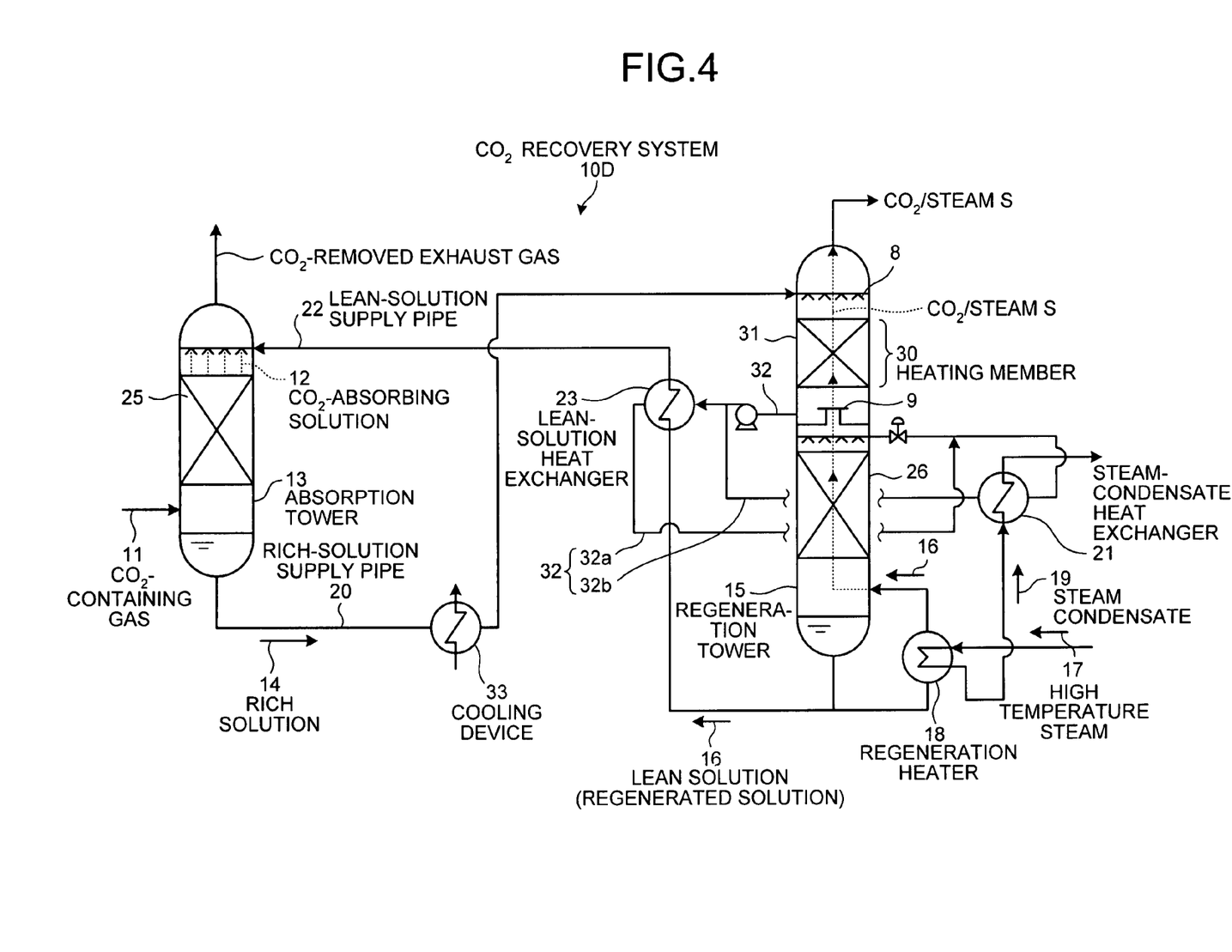
FIG. 4 is a schematic of a $CO_2$ recovery system according to a fourth embodiment of the present invention.

FIG. 4 is a schematic of a $CO_2$ recovery system 10D according to a fourth embodiment of the present invention. Components that are the same as those in each of the $CO_2$ recovery systems 10A, 10B, and 10C are assigned with the same reference numerals, and explanation thereof is omitted.

The $CO_2$ recovery system 10D further includes a first extraction path 32a and a second extraction path 32b that branch from the extraction path 32. The lean-solution heat exchanger 23 is provided in the first extraction path 32a, which extracts the rich solution 14 having been heated with the steam S in the heating member 30, and further heats the rich solution 14. The heated rich solution 14 is returned to the regeneration tower 15. The second extraction path 32b introduces the rich solution 14, which is heated with the steam condensate 19 in the steam-condensate heat exchanger 21, to the regeneration tower 15. The rich solution 14 can be divided into the first extraction path 32a and the second extraction path 32b at any ratio; however, it is preferable that ratio is about 9:1.

As a result of such a configuration, effective heating can be realized and reduction in the supply amount of steam used in the regeneration tower 15 can be achieved.

Figure 5:
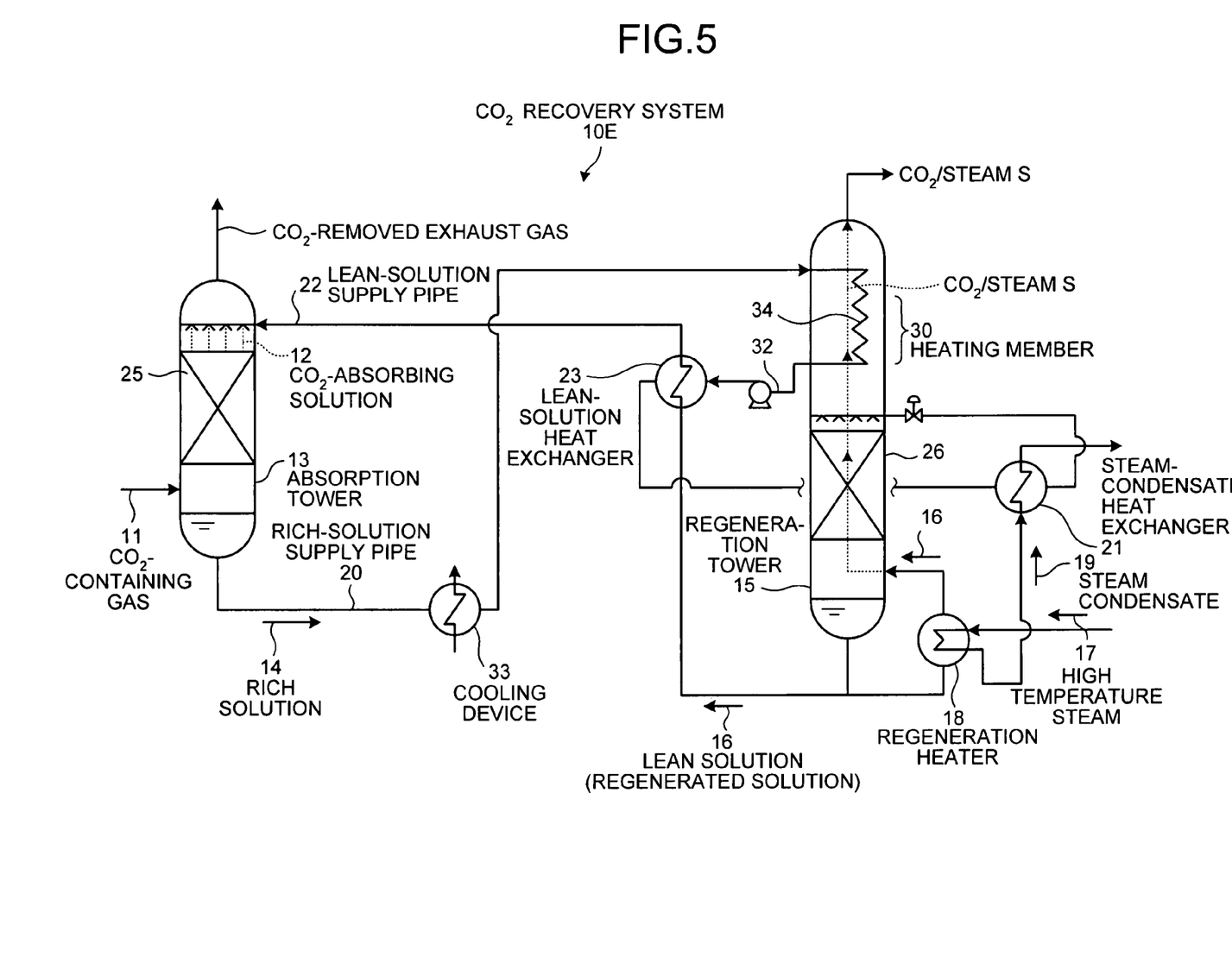
FIG. 5 is a schematic of a $CO_2$ recovery system according to a fifth embodiment of the present invention.

FIG. 5 is a schematic of a $CO_2$ recovery system 10E according to a fifth embodiment of the present invention. Components that are the same as those in each of the $CO_2$ recovery systems 10A to 10D are assigned with the same reference numerals, and explanation thereof is omitted.

The $CO_2$ recovery system 10E further includes a heat exchanger 34 in the heating member 30 of the regeneration tower 15 for using the heat of the steam S. As a result, effective heating can be realized and reduction in the supply amount of steam used in the regeneration tower 15 can be achieved.

The heat exchanger can be any device that transfers heat of one material to another material. The heat exchanger can be the plate heat exchanger and the shell-and-tube heat exchanger that are known in the art.

Figure 6:
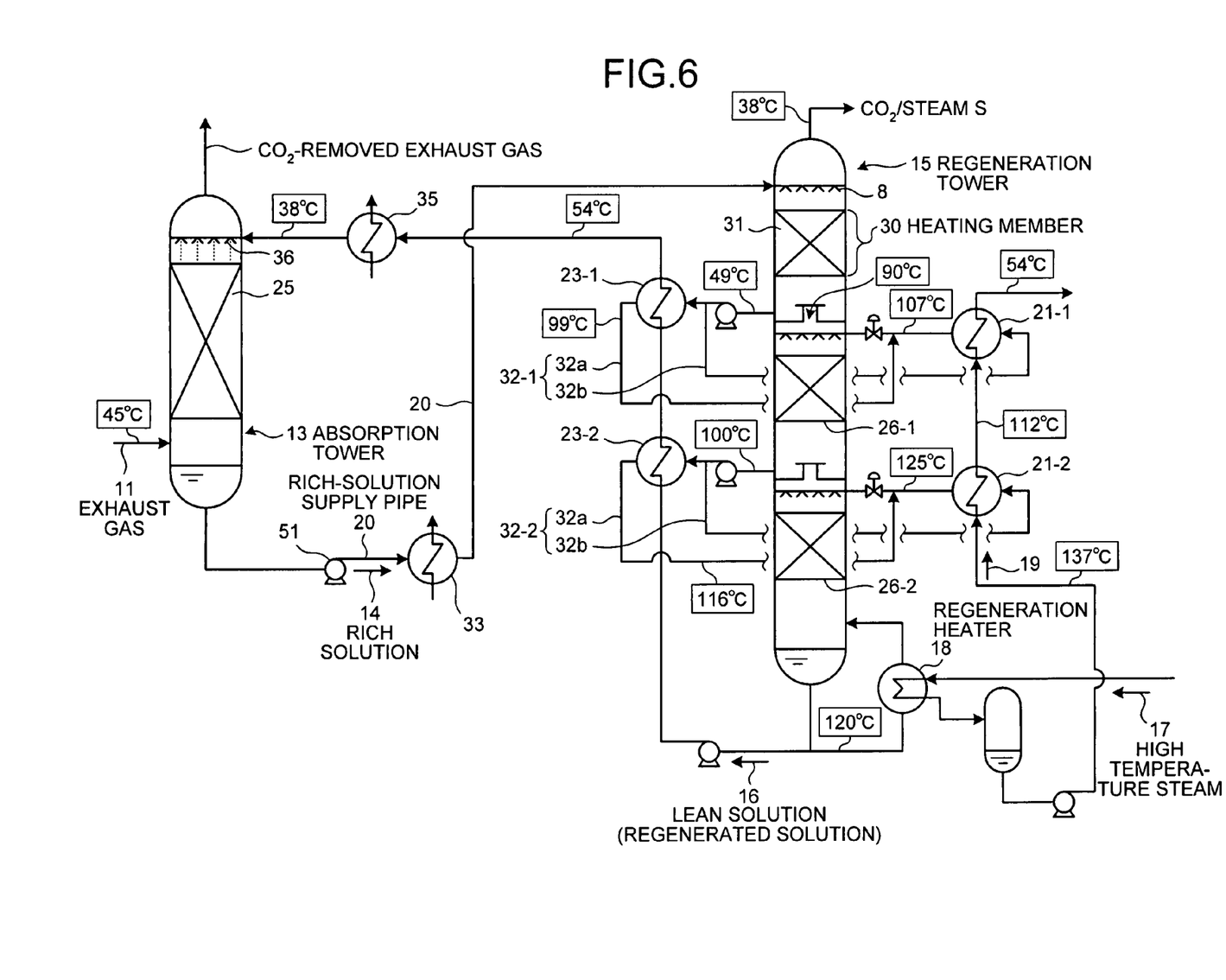
FIG. 6 is a schematic of a $CO_2$ recovery system according to an example.

A concrete example of the $CO_2$ recovery system is explained in detail below with reference to FIG. 6. Components that are the same as those of the $CO_2$ recovery systems 10A to 10E are assigned with the same reference numerals.

The regeneration tower 15 includes two filling layers, which are an upper-stage filling layer 26-1 and a lower-stage filling layer 26-2. The extraction path 32 that extracts the rich solution 14 branches into an upper-stage extraction path 32-1 and a lower-stage extraction path 32-2. An upper-stage steam-condensate heat exchanger 21-1 for the second extraction path 32b is provided in the upper-stage extraction path 32-1, while a lower-stage steam-condensate heat exchanger 21-2 for the second extraction path 32b is provided in the lower-stage extraction path 32-2.

The $CO_2$-containing gas 11 supplied to the absorption tower 13 is brought into countercurrent contact with the $CO_2$-absorbing solution 12 in the filling layer 25, the $CO_2$-absorbing solution 12 having predetermined concentration and being supplied from the nozzle 8. $CO_2$ in the combustion exhaust gas is absorbed and removed by the $CO_2$-absorbing solution 12, and the remaining $CO_2$-removed exhaust gas 10, from which $CO_2$ has been absorbed and removed, is fed to the outside. The $CO_2$-absorbing solution 12 supplied to the absorption tower 13 absorbs $CO_2$, and reaction heat due to the absorption causes the temperature of the $CO_2$-absorbing solution 12 to be raised above the normal temperature in a tower head. The $CO_2$ absorbing solution 12 with the absorbed $CO_2$ is sent by a discharge pump 51 for the absorbing solution, as the rich solution 14, via the rich-solution supply pipe 20, to be introduced into the regeneration tower 15. The cooling device 33 cools the rich solution 14.

In the regeneration tower 15, the $CO_2$-absorbing solution 12 is regenerated by being heated with the high temperature steam 17 by the regeneration heater 18, cooled as the lean solution 16 by the lean-solution heat exchanger 23 and a cooling device 35 provided as necessary, and is returned to the absorption tower 13.

In the upper portion of the regeneration tower 15, the rich solution 14 introduced via the nozzle 8 recovers the heat of the steam S in the heating member 30. The rich solution 14 is extracted by the upper-stage extraction path 32-1 and heated in the lean-solution heat exchanger 23-1 in the first extraction path 32a. Further, the rich solution 14 is heated in the upper-stage steam-condensate heat exchanger 21-1 in the second extraction path 32b.

The rich solution 14 having been heated in the upper-stage extraction path 32-1 is supplied to the upper-stage filling layer 26-1. Thereafter, the rich solution 14 is extracted and heated in the lower-stage extraction path 32-2 and supplied to the lower-stage filling layer 26-2.

Assuming that the rich solution 14, fed from the absorption tower 13, is cooled by the cooling device 33 so that the temperature of the rich solution 14 to be introduced from the tower head of the regeneration tower 15 becomes approximately 38° C., the temperature of the rich solution 14 introduced into the upper-stage filling layer 26-1 increases to approximately 107° C., and the temperature of the rich solution 14 introduced into the lower-stage filling layer 26-2 increases to approximately 120° C.

Accordingly, when, for example, $CO_2$ was removed from the exhausted gas with the amount of 555 $Nm^3$/H, the amount of steam of the high temperature steam 17 to be supplied to the regeneration heater 18 becomes 85 kg/H. The result is shown below in a below table.

| | present example | conventional example |
|---|---|---|
| exhaust gas amount (Nm3/H) | 555 | 555 |
| $CO_2$ concentration of exhaust gas (Vol %) | 10.3 | 10.3 |
| $CO_2$ recovery ratio (%) | 90 | 90 |
| $CO_2$ recovery amount (Nm3/H) | 46.3 | 46.3 |
| absorbing solution circulation amount (Kg/H) | 1000 | 1000 |
| temperature of absorbing solution introduced to regeneration tower (° C.) | 38 | 110 |
| temperature of absorbing solution output from regeneration tower (° C.) | 120 | 120 |
| temperature of $CO_2$ output from regeneration tower (° C.) | 38 | 92 |
| temperature in the bottom of regeneration tower (° C.) | 120 | 120 |
| regeneration heater steam amount (Kg/H) | 85 | 138 |
| regeneration heater input heat amount (Kcal/H) | 45,350 | 71,800 |
| heat generator (23-1) heat exchange amount (Kcal/H) | 50,000 | — |
| heat generator (23-2) heat exchange amount (Kcal/H) | 16,000 | — |
| heat generator (21-1) heat exchange amount (Kcal/H) | 4,930 | — |
| heat generator (21-2) heat exchange amount (Kcal/H) | 2,125 | — |

As can be confirmed from the table, in the conventional example, where the heat of the steam is not reused, the amount of steam used in the regeneration heater was 138 kg/H. On the contrary, the amount of the steam used in the regeneration heater according to the example is 85 kg/H, which means that there is an improvement of about 39%.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A $CO_2$ recovery system comprising:
   an absorption tower that receives $CO_2$-containing gas and $CO_2$-absorbing solution, and causes the $CO_2$-containing gas to come in contact with the $CO_2$-absorbing solution to produce $CO_2$ rich solution;
   a regeneration tower that receives the rich solution and produces lean solution from the rich solution by removing $CO_2$ from the rich solution;
   a first rich-solution conveying path that supplies the rich solution from the absorption tower to the regeneration tower;
   a heating member that is provided in the regeneration tower and that heats the rich solution in the regeneration tower with steam generated when regenerating the rich solution in the regeneration tower;
   a first lean-solution conveying path that conveys the lean solution from the regeneration tower to the absorption tower;
   a second rich-solution conveying path that extracts rich solution from the regeneration tower from a first point and returns extracted rich solution to the regeneration tower at a second point downstream of the first point; and
   a lean-solution heat exchanger provided in the first lean-solution conveying path and second rich-solution conveying path and heats the rich solution in the second rich-solution conveying path with the lean solution in the first lean-solution conveying path.

2. The $CO_2$ recovery system according to claim 1, further comprising:
   a second lean-solution conveying path that extracts the lean solution from the regeneration tower from a third point and returns extracted lean solution to the regeneration tower at a fourth point upstream of the third point; and
   a regeneration heater provided in the second lean-solution conveying path and heats the lean solution in the second lean-solution conveying path with saturated steam to produce steam condensate.

3. The $CO_2$ recovery system according to claim 1, further comprising:
   a steam-condensate heat exchanger provided in the second rich-solution conveying path and heats the rich solution in the second rich-solution conveying path with a steam condensate.

4. The $CO_2$ recovery system according to claim 2, further comprising:
   a cooling device that is provided in the first rich-solution conveying path for cooling the rich solution.

5. The $CO_2$ recovery system according to claim 1, further comprising:
   a cooling device that is provided in the first rich-solution conveying path for cooling the rich solution.

6. A $CO_2$ recovery method comprising:
   causing $CO_2$-containing gas to come in contact with $CO_2$-absorbing solution to produce $CO_2$ rich solution in an absorption tower;
   conveying the rich solution to a regeneration tower; and
   producing a lean solution from the rich solution by removing $CO_2$ from the rich solution in the regeneration tower,
   wherein the $CO_2$ recovery method comprises:
   heating the rich solution in the regeneration tower with steam generated when regenerating the rich solution in the regeneration tower;
   extracting rich solution from the regeneration tower at a first point, heating the extracted rich solution in a lean-solution heat exchanger by lean solution produced in the regeneration tower and returning the heated rich solution to the regeneration tower at a second point downstream of the first point; and extracting lean solution from the regeneration tower, heating extracted lean solution with steam, and returning heated lean solution to the regeneration tower, whereby steam condensate is produced from the steam due to loss of heat.

7. The $CO_2$ recovery method according to claim 6, further comprising cooling the rich solution before the rich solution is introduced into the regeneration tower.

* * * * *

UNITED STATES PATENT AND TRADEMARK OFFICE
CERTIFICATE OF CORRECTION

| | |
|---|---|
| PATENT NO. | : 7,892,509 B2 |
| APPLICATION NO. | : 11/513272 |
| DATED | : February 22, 2011 |
| INVENTOR(S) | : Masaki Iijima et al. |

It is certified that error appears in the above-identified patent and that said Letters Patent is hereby corrected as shown below:

ON THE TITLE PAGE:

At item (73), Assignee, change:

"(73) Assignee:    Mitsubishi Heavy Industries, Ltd., Osaka (JP)"

to

--(73) Assignees:    Mitsubishi Heavy Industries, Ltd., Tokyo (JP);
The Kansai Electric Power Co., Inc., Osaka (JP)--.

Signed and Sealed this
Seventeenth Day of May, 2011

David J. Kappos
*Director of the United States Patent and Trademark Office*